(12) United States Patent
Wang et al.

(10) Patent No.: US 8,078,708 B1
(45) Date of Patent: Dec. 13, 2011

(54) GRID PROXY ARCHITECTURE FOR NETWORK RESOURCES

(75) Inventors: Phil Wang, Nepean (CA); Indermohan Monga, Acton, MA (US); Tal Lavian, Sunnyvale, CA (US); Ramesh Durairaj, Santa Clara, CA (US); Franco Travostino, Arlington, MA (US)

(73) Assignee: Nortel Networks Limited, Mississauga, Ontario (CA)

( * ) Notice: Subject to any disclaimer, the term of this patent is extended or adjusted under 35 U.S.C. 154(b) by 1248 days.

(21) Appl. No.: 11/018,997

(22) Filed: Dec. 21, 2004

Related U.S. Application Data

(60) Provisional application No. 60/536,668, filed on Jan. 15, 2004.

(51) Int. Cl.
*G06F 15/173* (2006.01)
(52) U.S. Cl. ......... 709/223; 709/203; 709/217; 709/220
(58) Field of Classification Search ................. 709/201, 709/220, 223, 224, 217, 219, 203
See application file for complete search history.

(56) References Cited

U.S. PATENT DOCUMENTS

| | | | | | |
|---|---|---|---|---|---|
| 5,329,619 | A * | 7/1994 | Page et al. | ...................... | 709/203 |
| 7,171,470 | B2 * | 1/2007 | Doyle et al. | ................... | 709/225 |
| 7,493,358 | B2 * | 2/2009 | Keohane et al. | .............. | 709/201 |
| 7,562,143 | B2 * | 7/2009 | Fellenstein et al. | ........... | 709/226 |
| 2004/0015977 | A1 * | 1/2004 | Benke et al. | ................... | 718/105 |
| 2004/0268293 | A1 * | 12/2004 | Woodgeard | .................... | 717/101 |
| 2005/0027785 | A1 * | 2/2005 | Bozak et al. | ................... | 709/200 |
| 2005/0074529 | A1 * | 4/2005 | Cohen et al. | .................. | 426/106 |
| 2005/0076173 | A1 * | 4/2005 | Merril et al. | .................. | 711/100 |
| 2005/0076336 | A1 * | 4/2005 | Cutrell et al. | ................. | 718/100 |
| 2005/0076339 | A1 * | 4/2005 | Merril et al. | .................. | 718/104 |
| 2005/0138618 | A1 * | 6/2005 | Gebhart | ........................ | 717/176 |
| 2006/0149842 | A1 * | 7/2006 | Dawson et al. | .............. | 709/226 |
| 2006/0168584 | A1 * | 7/2006 | Dawson et al. | .............. | 718/104 |
| 2007/0079004 | A1 * | 4/2007 | Tatemura et al. | ............ | 709/238 |
| 2008/0123668 | A1 * | 5/2008 | Tan et al. | ....................... | 370/400 |

* cited by examiner

*Primary Examiner* — Lashonda Jacobs
(74) *Attorney, Agent, or Firm* — Christopher & Weisberg, P.A.

(57) ABSTRACT

A Grid Proxy Architecture for Network Resources (GPAN) is proposed to allow Grid applications to access resources shared in communication network domains. GPAN bridges Grid services serving user applications and network services controlling network devices through its proxy functions such as resource data and management proxies. Working with Grid resource index and broker services, GPAN employs distributed network service peers (NSP) in network domains to discover, negotiate and allocate network resources such as bandwidth for Grid applications. An elected master NSP is the unique Grid node that runs GPAN and represents the whole network to share network resources to Grids without Grid involvement of network devices. GPAN provides the Grid Proxy service (GPS) to interface with Grid services and applications, and the Grid Delegation service (GDS) to interface with network services to utilize network resources. Resource-based XML messaging is employed for the GPAN proxy communication.

21 Claims, 3 Drawing Sheets

GRID PROXY ARCHITECTURE FOR NETWORK RESOURCES

CROSS-REFERENCE TO RELATED APPLICATIONS

A claim of priority is made to U.S. Provisional Patent Application No. 60/536,668 entitled Grid Proxy Architecture for Network Resources, filed Jan. 15, 2004.

FIELD OF THE INVENTION

This invention is generally related to distributed computing, and more particularly to management of network resources in support of grid networks.

BACKGROUND OF THE INVENTION

Grid networks are emerging as the "killer application" of next-generation networks through the building of overlay networks upon existing network infrastructures for the purposes of network-wide computing and data collaboration. In a Grid network, which is also known as a virtual organization, Grid nodes are distributed widely in the physical networks and share their available hardware and software resources such as CPU, storage, data mining, and visualization centers. The resource sharing is actually provided by the Grid services running on Grid nodes. Those Grid services form the Grid overlay over the Grid nodes as they function under the same Grid rule.

According to the available services and resources, a Grid user distributes portions of his/her application task in the Grid nodes and puts those services and resources together to complete the user task with very high performance. Benefits of this technology include preventing resource wasting in the network and saving the user capital expenditure on equipment. Typical use cases of Grids include data-intensive and computation-intensive business tasks such as enterprise concurrent product design, utility computing, large-scale data synchronization, and many high-performance computations including nuclear energy simulations and long-term global weather forecasting.

Distributed computing in general, and grid computing in particular, is desirable because complex and resource-intensive computing tasks can be accomplished without purchasing and maintaining costly super-computers. Rather, relatively small portions of the overall computing task can be distributed among multiple computers and devices of relatively modest capability. It will be appreciated that the grid network capability may also be more easily scalable than high performance devices and super-computers. Further, there is a potential business model for the rental of grid services.

The dispersed Grid nodes are connected by network infrastructure such as the Internet. Grid nodes include computers, data servers and network devices. Resource sharing of network devices in a Grid is critical because it provides the interconnectivity of Grid nodes to form a pipeline of resource supply in the Grid. In other words, interconnectivity enables reliable sharing of resources such as computing power and data services.

One problem hindering the advance of Grid technology is that the requisite resource sharing of network nodes is not entirely supported by traditional networks. First, Grid nodes generally require a piece of Grid software installed on each Grid node. While this installation is relatively easy on a computer, it can be impractical on network devices such as routers and switches. Without installation of the Grid software, a network device cannot purposefully make its resource available to the Grid, and a Grid node cannot access a network device through the same Grid rule.

Another problem hindering the advance of Grid technology is that network devices are typically located in autonomous network domains, and controlled by network management facilities such as network managers and services. The network management facilities form an actual overlay network which is the network service overlay and gives the API for network control functions. In other words, the network service overlay consists of network services that are running on network devices. Thus, in a Grid network, there are two overlay networks: the network service overlay and the Grid service overlay. But there is a gap between these two overlays. The gap is that they are not compatible because network services and Grid services use different service infrastructures. Moreover, due to the modest capability of CPU and memory on network devices, network services are generally implemented in lightweight network software while Grid services are generally implemented in heavyweight software and thus require much more CPU power and storage.

It would therefore be desirable to have a technique for causing the two overlays to work together. In other words, network nodes should be capable of acting as Grid nodes in order to provide its resources such as network links and bandwidth in a Grid.

SUMMARY OF THE INVENTION

The present invention overcomes the above-mentioned and other drawbacks by providing a Grid-based proxy mechanism to allow Grid services and applications to access and utilize resources available in the physical network domains. In accordance with the invention, a Grid Proxy Architecture for Network Resources ("GPAN) bridges a grid services overlay that includes of Grid services to serve user applications, with a network services overlay that includes network services to control the network devices. The GPAN proxy gives the Grid services in the Grid Service overlay the potential to access the network services in the Network Service overlay in order to control the networks for resource use. With GPAN, network nodes do not need to install and run a piece of Grid service software in order to provide their resources to the Grids. Network nodes are represented in a whole by the GPAN proxy and joined the Grids by a unique Grid node which runs the actual proxy software/system.

In one embodiment of the invention, GPAN works with the network service overlay to gather network resource information and provide that information to the Grid resource index service within the Grid network. GPAN may also facilitate brokerage and reservation of network resources upon the request of a Grid resource broker service within the Grid network by translating application requests from the Grid services to network operations of the network services.

In one embodiment the invention employs network service peers/agents ("NSPs") distributed in the network domains in order to obtain network resource information and allocate network resources for the Grids. Each NSP may include an individual network domain, including various sub-nets, and may be operated by a different service provider. Of the NSPs, only the master NSP executes the GPAN proxy in a Grid network. The master NSP is usually selected from an NSP which is close to the location where run Grid resource services such as index, broker and scheduler. A master NSP may be elected based on how the Grid is organized and how easily the Grid accesses the network resources. Under the GPAN proxy, the master NSP sends network instructions to each NSP for resource operations such as information collection and allocation. Further, the master NSP provides Grid-based proxy APIs of resource operations to Grid services and applications. Consequently, the node running the master NSP is the unique Grid node representing the whole networks. The Grid services and applications talk to this master NSP node for network resource supply. They use the GPAN APIs which are provided in the form of Grid services to access the network resources. It will therefore be apparent that no actual network nodes need to execute native grid protocols.

In one embodiment of the invention GPAN provides at least two proxy functions, resource data proxy and resource management proxy. The resource data proxy function is to provide resource discovery, status (create/destroy/use), availability and service policy for the Grid network. The resource management proxy function provides resource scheduling, new/allocate/reallocate/release in the Grid network. GPAN sends resource information to the global Grid resource services such as index, through the resource data proxy. GPAN receives resource allocation requests of Grid apps from a Grid resource broker or scheduler service through the resource management proxy. Each proxy function may implement different proxy mechanisms. For example, the resource data proxy implements a network information provider ("NIP") which is a Grid-based software to facilitate collection of network information and provide updates and reports to the Grid resource index service. The resource management proxy function implements a resource allocation and management provider ("RAMP") which is also a Grid-based software to receive resource allocation requests from the Grid broker/meta-scheduler services and schedule resource operations in the communications network.

In one embodiment of the invention GPAN includes two main components: a Grid Proxy service ("GPS") and a Grid Delegation service ("GDS"). GPS interfaces the GPAN proxy with the Grid overlay of Grid services to meet applications. GDS interfaces the proxy with the Network Service overlay of network services to utilize network resources. Resource-based XML messaging may be utilized for communication between GPS and GDS.

By implementing at least some of the features described above, GPAN advantageously causes the communications network to appear as grid resources from the perspective of the grid network. For example, the resource availability data is periodically gathered from each network service peer and provided to an index of the grid network in a format that is compliant with the protocols utilized by the index. Further, GPAN implements an API that is compliant with the signaling utilized by the grid manager in order to facilitate resource brokerage and reservation. Following receipt of a request from the Grid application, and identification of requisite resource from the index, a broker/meta-scheduler of the grid network signals to the grid resources and GPAN in order to reserve and utilize the resources. The broker/meta-scheduler signals for resource reservation to both the grid resources and GPAN in the same, grid-standard compliant manner. GPAN implements an API which is operative to translate commands from the broker/meta-scheduler into a format that may be utilized by the communications network nodes. Consequently, two-way communications between the network resources and grid manager are possible, thereby enabling operations such as bandwidth allocation, negotiation, agreement, information feedback, and status tracking. Once the appropriate communications network and grid network resources are made available for the application, portions of the overall task are distributed to the grid resource services either directly by the broker/meta-scheduler or via GPAN.

DETAILED DESCRIPTION

Figure 1:
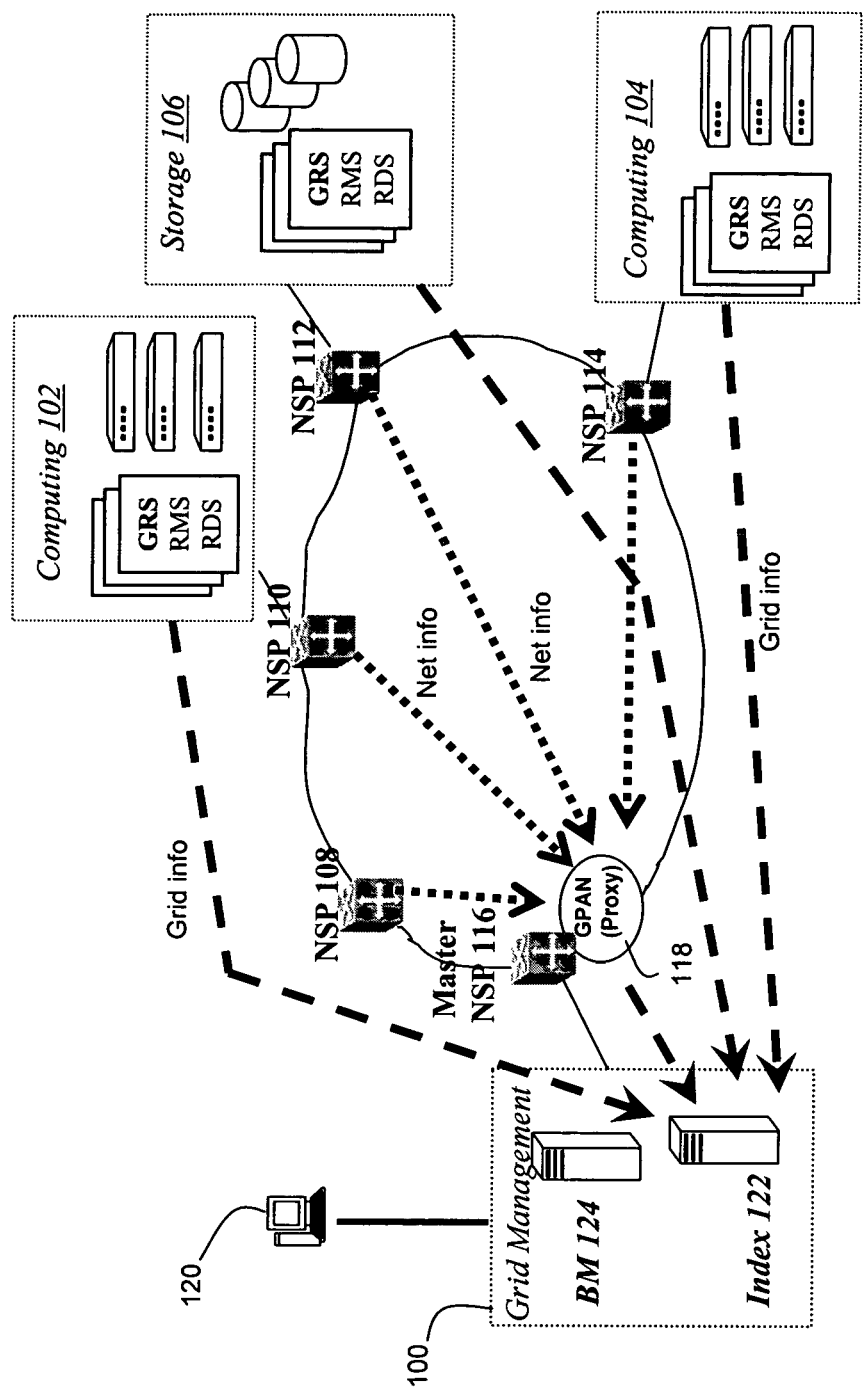
FIG. 1 is a block diagram of grid network architecture illustrating gathering of communications network resource information for the grid resource index by GPAN.

Referring to FIG. 1, a grid computing network architecture includes multiple grid resources that are in communication via multiple communications network elements. The grid resources may include a grid resource manager 100, computing resource provider 102, 104 and storage resource provider 106. The grid manager, computing resource provider and storage resource provider execute Grid-based Resource Services (GRS) such as Resource Management Services (RMS) and Resource Data Services (RDS). The communications network elements include various switching and routing devices which make up network services peers ("NSPs") 108-114, and a master network service peer 116 that implements a Grid Proxy Architecture for Network Resources ("GPAN") 118 for the grid network. An application device 120 which originates a request for execution of an application on the grid communicates with the grid network through the grid manager 100.

The grid manager 100 manages grid-enabled resources shared in the Grid network to user applications. It may use an index node 122 which is operative to execute grid computing protocols to produce an index of available grid resources. For example, the index may include address information and an indication of availability for each grid resource through respective RDS on each resource provider. It may also use a grid broker/meta-scheduler 124 which is operative in response to a request from the application node 120 to identify a set of grid resources from the index with which to satisfy the application request. Once the set of grid resources is determined, the broker/meta-scheduler signals the grid resources to prepare them to be utilized. For example, the grid resources may be verified as available, reserved, and charges for the services may be arranged. Once the grid resources are prepared, the broker/meta-scheduler 124 distributes portions of the overall task to individual ones of the grid services through respective RMS in each resource provider. The broker/meta-scheduler is also operative to coordinate responses from the grid services 102-106 for the particular application task.

The GPAN 118 is executed at least in-part by the master network service peer 116 and is operative to cause the communications network to appear, relative to the grid manager 100, as a grid-compliant resource provider of network. One function of the GPAN 118 is to gather communications network resource information on behalf of the index 122. Data indicating the availability of network resources such as NSPs 108-114 can be actively gathered using any of a variety of network protocols, such as simple network management protocol ("SNMP"). Alternatively, some network devices may be configured to automatically provide resource availability data to the GPAN. In addition to obtaining resource availability data, the GPAN 118 generates a mapping of the available resources, including the various communications network nodes and links which interconnect the grid resources. The resource availability information and mapping are then translated into a format that can be processed by the index 122, and transmitted to the index for storage. The information in the index can then be processed by the broker/meta-scheduler 124 in a substantially similar manner as normally generated and stored grid resource information.

Figure 2:
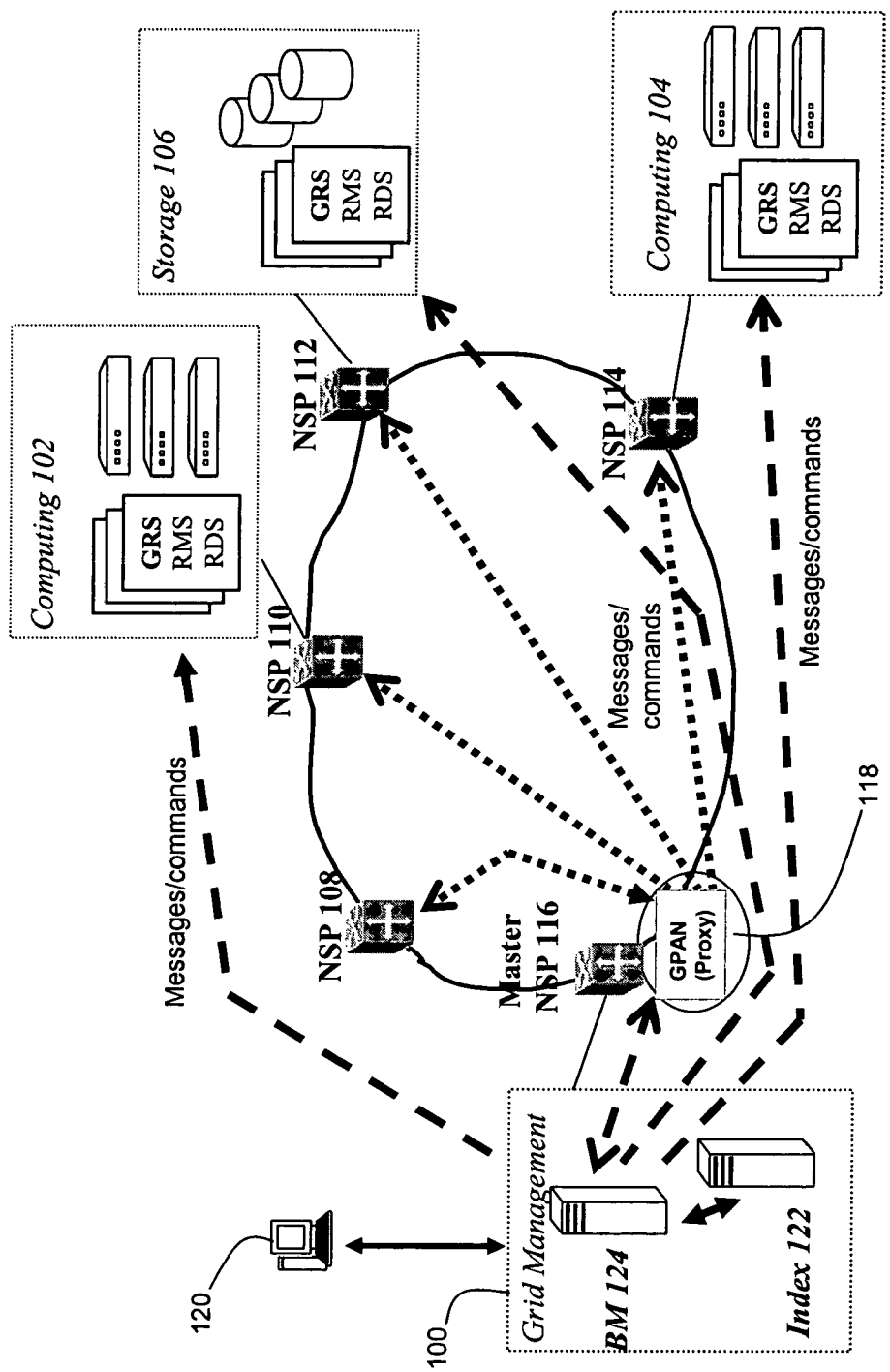
FIG. 2 illustrates reservation of communications network resources in the architecture of FIG. 1.

Referring now to FIG. 2, the GPAN 118 also implements its Grid service API so that it can be accessed by the grid manager 124 though standard Grid service invocation in order to facilitate resource brokerage and reservation. Following receipt of a request from the application 120 and identification of requisite resource from the index 122, the broker/meta-scheduler 124 signals to the grid resources 102-106 and the GPAN 118 in order to reserve and utilize the identified resources. In particular, the broker/meta-scheduler 124 signals for resource reservation to both the grid resources and the GPAN in the same, grid-standard compliant manner. The GPAN 118 is operative to translate the signaled commands from the broker/meta-scheduler 124 into a format that may be utilized by the communications network nodes of NSPs 108-114. Further, the GPAN is operative to translate messages returned from the network nodes of the NSPs to the broker/meta-scheduler. Consequently, two-way communications between the network resources and grid manager are possible. Communications between the network resources and grid manager may support operations such as bandwidth allocation, negotiation, agreement, information feedback, and status tracking. Once the appropriate communications network and grid network resources are made available for the task sent to the grid, portions of the overall task are distributed to the grid resource services either directly by the broker/meta-scheduler or via the GPAN.

Figure 3:
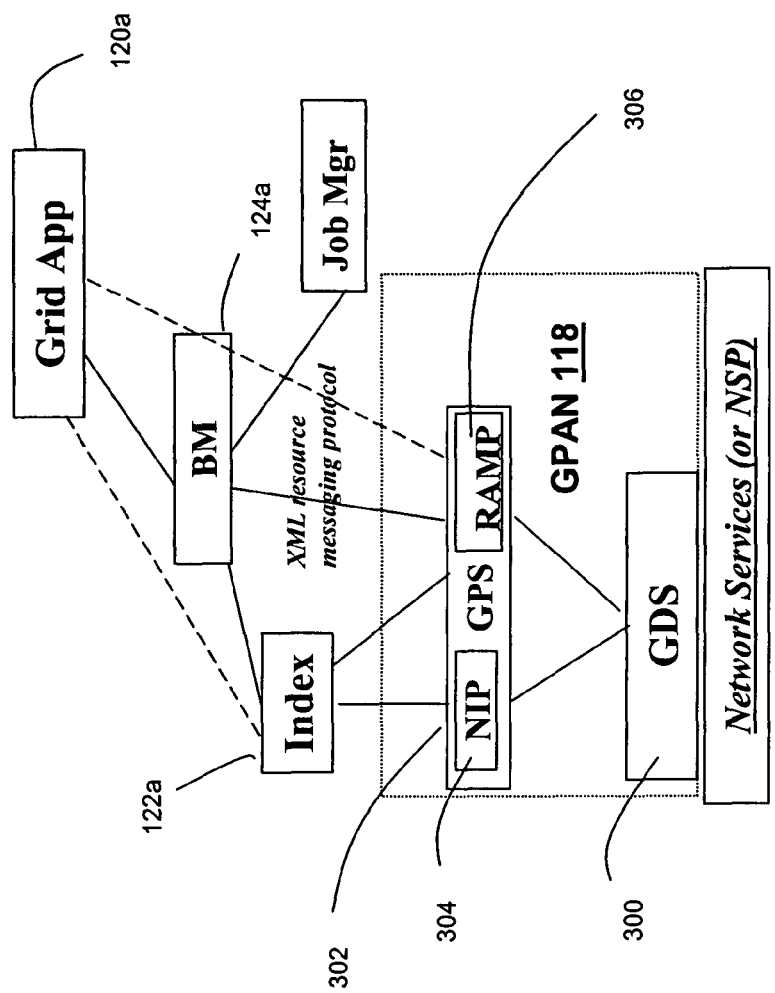
FIG. 3 is a block diagram that illustrates the GPAN proxy in greater detail.

Referring now to FIGS. 2 and 3, the GPAN 118 includes two main components: a Grid Delegation Service ("GDS") 300 and a Grid Proxy Service ("GPS") 302. The GPS 302 is operative to accept network resource requests from upper layer grid services in the Grid Service overlay such as the broker/meta-scheduler 124a, index 122a, and end user application 120a. Resource requests include requests for resource information, resource allocation, and related operations. The GPS 302 passes those requests to the GDS 300, and returns feedback received in response to the requests back to the request initiator. The GDS processes the resource requests from the GPS to determine which NSPs 108-114 in the Network Service overlay are indicated to be part of the particular grid operation. The GDS also collects resource information and results from the NSPs for return to the GPS. As shown specifically in FIG. 3, the GPS and GDS components of the GPAN logically reside on two overlay networks: GPS on the Grid Service Overlay and GDS on the Network Service Overlay. But they may reside on a host such as the master service peer or two different hosts. For example, GPS 302 can reside in a grid-based hosting environment that is logically proximate to the grid manager 100 (FIG. 2), and the GDS 300 can reside in a network service hosting environment that is logically proximate to the master network service peer 116 (FIG. 2). Consequently, GPS is the GPAN contact point in the grid network overlay while GDS is the GPAN contact point in the network service overlay.

The GPAN 118 may provide respective network resource provider as necessary and appropriate. For example, a network information provider ("NIP") 304 facilitates collection of network information and provides updates and reports to the grid manager index. A resource allocation and management provider ("RAMP") 306 may receive resource allocation requests from the broker/meta-scheduler and provide scheduling resources in the communications network.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer program product for facilitating interaction between a grid network having a plurality of grid computing resources associated with a plurality of computing nodes and a communication network having a plurality of network communication resources associated with a plurality of network nodes, where the grid computing resources are interconnected by the network communication resources, comprising:
   logic operative to obtain information from the network communication resources indicative of availability of those communication resources;
   logic operative to translate the network communication resource availability information from a supply format to a target format; and
   logic operative to provide the network communication resource availability information in the target format to at least one of the grid computing resources, thereby enabling analysis of both the computing resources and the communication resources via which the computing resources are interconnected.

2. The product of claim 1 wherein the network resource availability information in the target format is provided to an index associated with a grid resource manager.

3. The product of claim 1 wherein the supply format is a communications network format that is not processable by the grid network, and the target format is a grid network format that is processable by the grid network.

4. The product of claim 1 wherein the information includes an indication of availability of bandwidth between particular nodes.

5. The product of claim 1 further including an interface operative to translate messages from the grid network into a format that may be utilized by the communications network nodes.

6. The product of claim 5 wherein the interface is further operative to translate messages from the communications network into a format that may be utilized by the grid network, whereby two-way communications between the network resources and grid manager are possible in support of operations such as bandwidth allocation, negotiation, agreement, information feedback, and status tracking.

7. The product of claim 6 wherein once appropriate communications network and grid network resources are determined to be available at least some portions of the overall task are distributed to the grid resource services via GPAN.

8. A method for facilitating interaction between a grid network having a plurality of grid computing resources and a communication network having a plurality of network communication resources, where the grid computing resources are interconnected by the network communication resources, comprising the steps of:
   obtaining information from the network communication resources indicative of availability of those communication resources;
   translating the network communication resource availability information from a supply format to a target format; and providing the network communication resource availability information in the target format to at least one of the grid computing resources, thereby enabling analysis of both the computing resources and the communication resources via which the computing resources are interconnected.

9. The method of claim 8 including the further step of providing the network resource availability information in the target format to an index associated with a grid manager.

10. The method of claim 8 wherein the supply format is a communications network format that is not processable by the grid network, and the target format is a grid network format that is processable by the grid network.

11. The method of claim 8 including the further step of providing an indication of availability of bandwidth between particular nodes in the information.

12. The method of claim 8 including the further step of translating messages from the grid network into a format that may be utilized by the communications network nodes.

13. The method of claim 12 including the further step of translating messages from the communications network into a format that may be utilized by the grid network, whereby two-way communications between the network resources and grid manager are possible in support of operations such as bandwidth allocation, negotiation, agreement, information feedback, and status tracking.

14. The method of claim 13 including the further step of distributing at least some portions of the overall task to the grid resource services via GPAN once appropriate communications network and grid network resources are determined to be available.

15. Apparatus that facilitates interaction between a grid network having a plurality of grid computing resources and a communication network having a plurality of network communication resources, where the grid computing resources are interconnected by the network communication resources, comprising:

means for obtaining information from the network communication resources indicative of availability of those communication resources;

means for translating the network communication resource availability information from a supply format to a target format; and means for providing the network communication resource availability information in the target format to at least one of the grid computing resources, thereby enabling analysis of both the computing resources and the communication resources via which the computing resources are interconnected.

16. The apparatus of claim 15 further including means for providing the network resource availability information in the target format to an index associated with a grid manager.

17. The apparatus of claim 15 wherein the supply format is a communications network format that is not processable by the grid network, and the target format is a grid network format that is processable by the grid network.

18. The apparatus of claim 15 further including means for including an indication of availability of bandwidth between particular nodes in the information.

19. The apparatus of claim 15 further including means for translating messages from the grid network into a format that may be utilized by the communications network nodes.

20. The apparatus of claim 19 further including means for translating messages from the communications network into a format that may be utilized by the grid network, whereby two-way communications between the network resources and grid manager are possible in support of operations such as bandwidth allocation, negotiation, agreement, information feedback, and status tracking.

21. The apparatus of claim 20 further including means for distributing at least some portions of the overall task to the grid resource services via GPAN once appropriate communications network and grid network resources are determined to be available.

* * * * *